Figure 1:
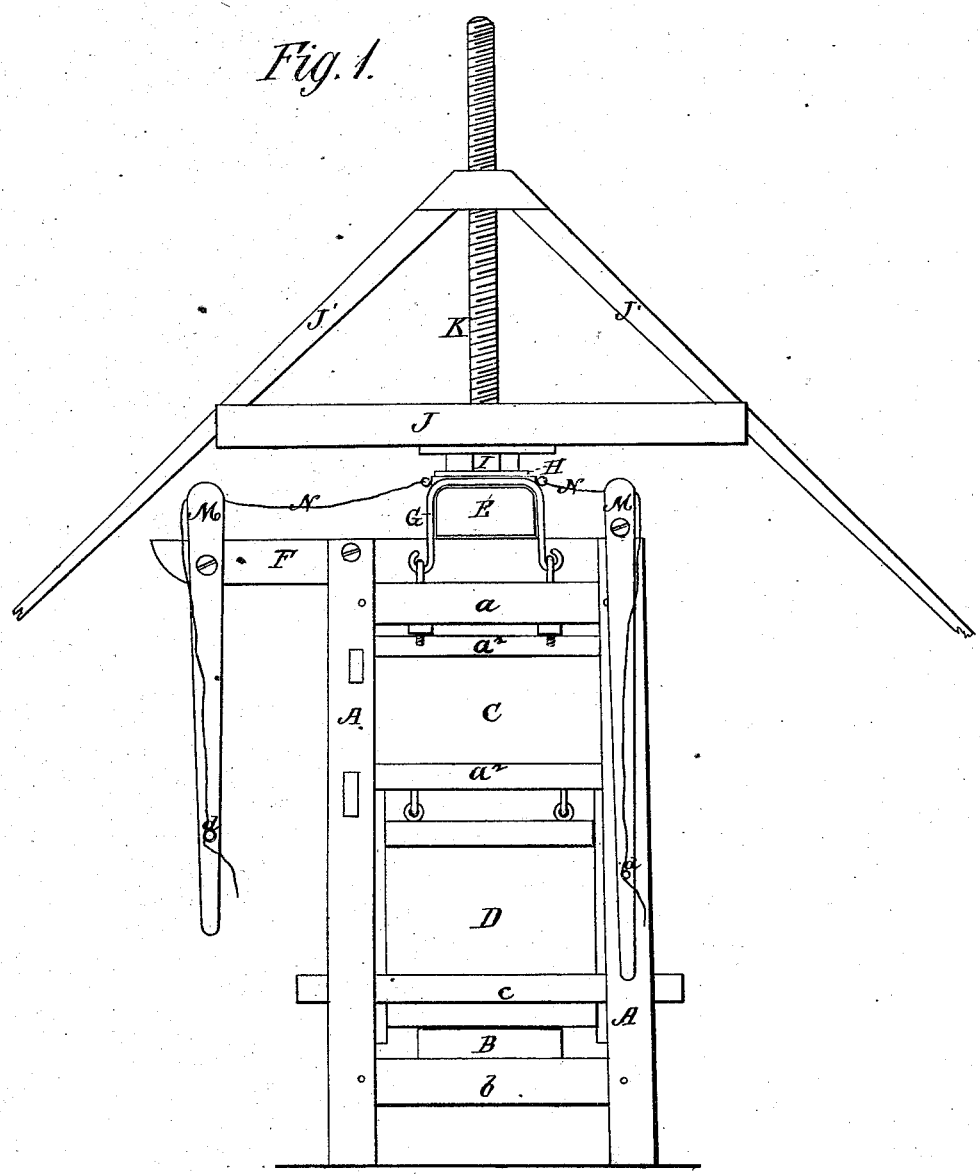

2 Sheets--Sheet 1.

W. C. BANKS.
Hay and Cotton-Presses.

No. 158,884. Patented Jan. 19, 1875.

WITNESSES:

INVENTOR:

ATTORNEYS.

2 Sheets--Sheet 2.
W. C. BANKS.
Hay and Cotton-Presses.
No. 158,884.
Patented Jan. 19, 1875.
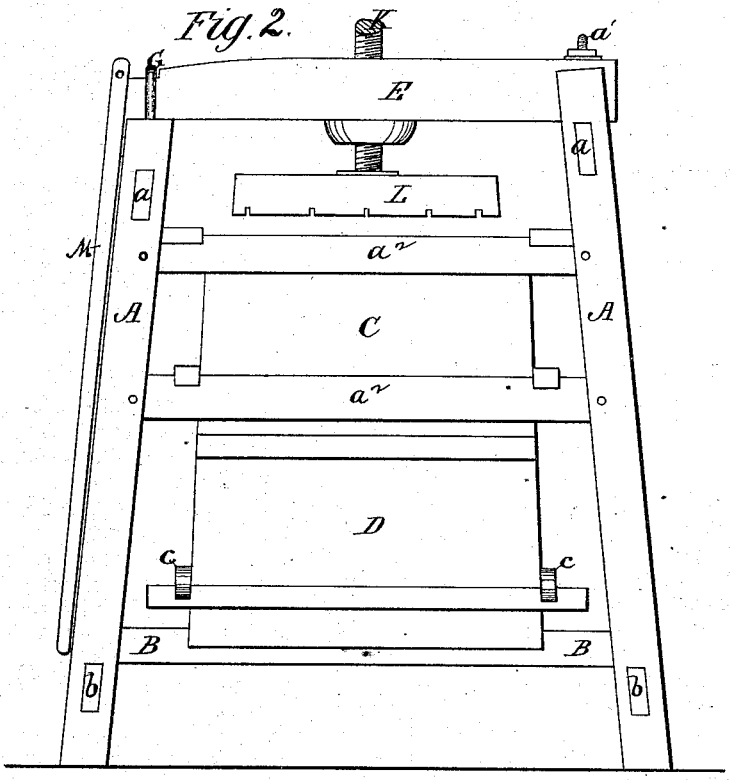
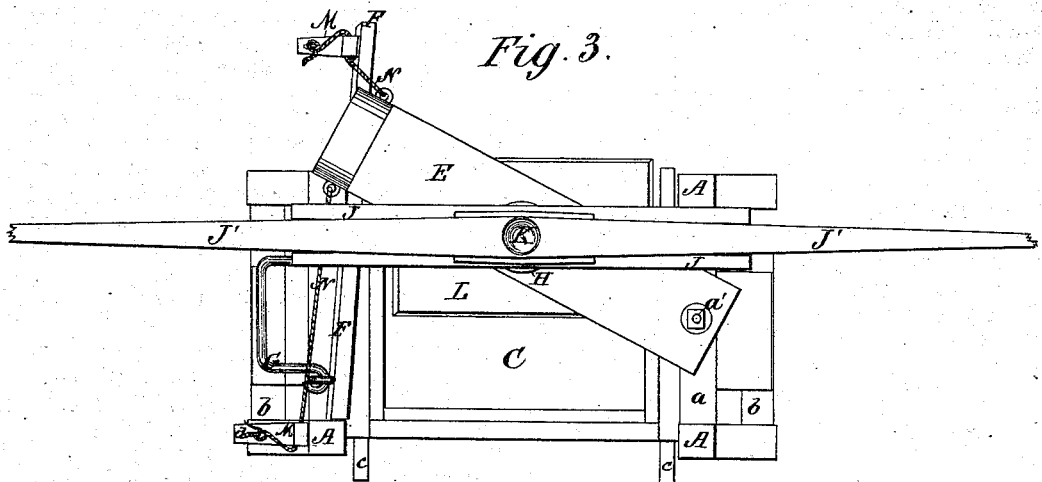
WITNESSES:
INVENTOR:
Wm. C. Banks
BY
ATTORNEYS.

UNITED STATES PATENT OFFICE.

WILLIAM C. BANKS, OF COMO, MISSISSIPPI, ASSIGNOR TO MRS. REBECCA BANKS, OF SAME PLACE.

IMPROVEMENT IN HAY AND COTTON PRESSES.

Specification forming part of Letters Patent No. 158,884, dated January 19, 1875; application filed November 25, 1874.

*To all whom it may concern:*

Be it known that I, WILLIAM C. BANKS, of Como, in the county of Panola and State of Mississippi, have invented a new and Improved Hay and Cotton Press; and I do hereby declare that the following is a full, clear, and exact description of the same, reference being had to the accompanying drawing forming a part of this specification, in which—

Figure 1 is an end elevation; Fig. 2, a front elevation; Fig. 3, a top view with the follower moved to one side.

This invention relates to certain improvements in cotton-presses; and consists in the peculiar construction of the box in which the bale is compressed, and the peculiar construction and arrangement of the devices for adjusting the follower-blocks and its pivoted supporting-bar in its position to one side of the box, for the purpose of obviating the obstruction usually afforded by the same when the box is being filled.

In the drawing, A represents the four corner posts, which are held together and braced by the cross-ties $a$ and $b$. Upon the lower ties $b$ rests the piece B, which forms the bottom of the box in which the bale is compressed. C is the box, which is contained in the cross-ties $a^2$, is larger at the bottom than the top, and provided with the four folding doors D, fastened by the cross-catches $c$. E is a cross-bar, which rests at one end upon the top of one of the cross-ties $a$, and is pivoted to it by a vertical bolt, $a^1$. At the other end the said bar E is free, and rests upon a horizontal bar, F, extended beyond the frame in the form of an arm. G is a substantial loop or strap of metal, which is attached to cross-tie $a$, and is folded over the free end of bar E to secure it, or is let down to allow said bar motion around bolt $a^1$ as a center. Said bar E contains a metallic collar, whose upper surface forms the plate H, and in this collar revolves the nut I, which is bolted to a gimlet-head, J. Said gimlet-head J has attached to it two levers, J' J', and by moving these the screw K, contained within the nut I, is actuated in a vertical direction with the follower-block L. M M are levers pivoted to the extremity of posts A, which latter on this side of the frame are made shorter to allow the bar E to slide out, upon the arm F, over the same. N N are ropes, which are attached to each side of the bar E, and pass through holes in the sides of levers M, the said ropes being fastened to pegs or cleats $d$ below. These ropes serve to move the bar E, with the follower and other appendages, to one side when filling the box, one set serving to move the follower out of the way, and the other to restore it to its former position.

The mode of operating levers M M for this purpose is to elevate them and tighten the rope by fastening it to the pegs $d$, and then, by depressing the same, bring the bar E with its appendages in the direction of the draft.

In the arrangement of my frame and the construction of the box C, I make the lower part of the latter a little wider and longer than the top, for the purpose of avoiding the greater portion of the lateral pressure upon the doors, due to the bulging out of the cotton.

By means of this shape of box I can obtain a very heavy degree of compression with but little strain upon the doors, and the latter, in consequence, need not be made so substantial, nor braced so strongly.

Having thus described my invention, what I claim as new is—

1. The combination, with the radially-moving bar E, of the levers M, having perforated ends and pegs $d$, and the ropes N, substantially as and for the purpose described.

2. In a baling-press, a box having increasing transverse dimensions as it tapers from the mouth to the part where the bale is compressed, substantially as and for the purpose specified.

WM. C. BANKS.

Witnesses:
   J. H. POINTER,
   M. POINTER.